US 11,409,755 B2

(12) United States Patent
Ferenczi et al.

(10) Patent No.: US 11,409,755 B2
(45) Date of Patent: Aug. 9, 2022

(54) ASYNCHRONOUS SEARCH OF ELECTRONIC ASSETS VIA A DISTRIBUTED SEARCH ENGINE

(71) Applicant: Elasticsearch B.V., Mountain View, CA (US)

(72) Inventors: Jim Ferenczi, Paris (FR); Luca Cavanna, Amsterdam (NL); Simon Daniel Willnauer, Berlin (DE)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 17/239,942

(22) Filed: Apr. 26, 2021

(65) Prior Publication Data
US 2022/0207037 A1   Jun. 30, 2022

Related U.S. Application Data

(60) Provisional application No. 63/131,993, filed on Dec. 30, 2020.

(51) Int. Cl.
*G06F 16/24* (2019.01)
*G06F 16/2458* (2019.01)
*G06F 16/2455* (2019.01)
*G06F 16/242* (2019.01)
*G06F 11/34* (2006.01)
*G06F 16/22* (2019.01)

(52) U.S. Cl.
CPC ...... *G06F 16/2477* (2019.01); *G06F 11/3423* (2013.01); *G06F 16/2272* (2019.01); *G06F 16/2425* (2019.01); *G06F 16/2471* (2019.01); *G06F 16/24561* (2019.01)

(58) Field of Classification Search
CPC ............. G06F 16/2471; G06F 16/2272; G06F 16/24561
See application file for complete search history.

(56) References Cited

U.S. PATENT DOCUMENTS

| | | | |
|---|---|---|---|
| 6,421,675 B1 | 7/2002 | Ryan et al. | |
| 6,957,261 B2 * | 10/2005 | Lortz | H04L 41/0893 709/226 |
| 7,599,938 B1 | 10/2009 | Harrison, Jr. | |
| 7,698,261 B1 | 4/2010 | Khoshnevisan | |
| 7,783,630 B1 | 8/2010 | Chevalier et al. | |
| 7,873,641 B2 | 1/2011 | Frieden | |
| 7,945,571 B2 | 5/2011 | Wanker | |

(Continued)

OTHER PUBLICATIONS

"Google Enterprise Search"; Obtained from Internet: <http://www.google.com/enterprise/search/prodcuts_gss_features.html>; retrieval date: Oct. 10, 2012; 3 pages.

(Continued)

*Primary Examiner* — Baoquoc N To
(74) *Attorney, Agent, or Firm* — Carr & Ferrell LLP

(57) ABSTRACT

Asynchronous search of electronic assets via a distributed search engine is disclosed herein. An example method includes receiving a request from a user, the request including a query and a query time parameter, the query time parameter defining a time that the user will wait for results to be completed synchronously, determining that the query is incomplete and that the time has been exceeded, issuing the query a unique query identifier, and asynchronously adding results to an index based on the unique query identifier.

20 Claims, 4 Drawing Sheets

(56) References Cited

U.S. PATENT DOCUMENTS

| | | | |
|---|---|---|---|
| 7,958,127 | B2 | 6/2011 | Edmonds et al. |
| 8,131,716 | B2 | 3/2012 | Chevalier et al. |
| 8,312,009 | B1 | 11/2012 | Bostock |
| 8,386,482 | B2 | 2/2013 | Gopalakrishnan |
| 8,412,702 | B2 | 4/2013 | Cozzi |
| 8,527,344 | B2 | 9/2013 | Rosenthal |
| 8,577,856 | B2 | 11/2013 | Mizrahi |
| 8,620,891 | B1 | 12/2013 | Thirumalai |
| 8,744,978 | B2 | 6/2014 | Zhuang et al. |
| 8,874,586 | B1 | 10/2014 | Sommers et al. |
| 8,892,552 | B1 | 11/2014 | Hansson et al. |
| 8,943,401 | B2 | 1/2015 | Martinez et al. |
| 8,959,073 | B2 | 2/2015 | Riley et al. |
| 9,189,552 | B2 | 11/2015 | Riley et al. |
| 9,619,528 | B2 | 4/2017 | Riley et al. |
| 9,959,352 | B2 | 5/2018 | Riley et al. |
| 9,959,356 | B2 | 5/2018 | Riley et al. |
| 10,013,493 | B1 | 7/2018 | Gandhi |
| 10,467,309 | B2 | 11/2019 | Riley et al. |
| 10,579,693 | B2 | 3/2020 | Riley et al. |
| 2004/0068486 | A1 | 4/2004 | Chidlovskii |
| 2004/0078224 | A1 | 4/2004 | Schramm-Apple et al. |
| 2004/0093321 | A1 | 5/2004 | Roustant et al. |
| 2006/0064411 | A1 | 3/2006 | Gross et al. |
| 2006/0179337 | A1 | 8/2006 | Goodman |
| 2007/0067297 | A1 | 3/2007 | Kublickis |
| 2007/0112781 | A1 | 5/2007 | McMullen et al. |
| 2007/0175674 | A1 | 8/2007 | Brinson et al. |
| 2007/0185826 | A1 | 8/2007 | Brice et al. |
| 2008/0016098 | A1 | 1/2008 | Frieden et al. |
| 2008/0082904 | A1 | 4/2008 | Martinez et al. |
| 2008/0201348 | A1 | 4/2008 | Edmonds et al. |
| 2008/0222140 | A1 | 9/2008 | Lagad et al. |
| 2008/0288446 | A1 | 11/2008 | Hu et al. |
| 2009/0100051 | A1 | 4/2009 | Bhatt et al. |
| 2009/0106202 | A1 | 4/2009 | Mizrahi |
| 2009/0138458 | A1 | 5/2009 | Wanker |
| 2009/0171813 | A1 | 7/2009 | Byrne et al. |
| 2009/0234834 | A1 | 9/2009 | Cozzi |
| 2009/0254529 | A1 | 10/2009 | Goldentouch |
| 2010/0274783 | A1 | 10/2010 | Chevalier et al. |
| 2011/0016104 | A1 | 1/2011 | Leconte |
| 2011/0022549 | A1 | 1/2011 | Zhuang et al. |
| 2011/0055186 | A1 | 3/2011 | Gopalakrishnan |
| 2011/0087647 | A1 | 4/2011 | Signorini et al. |
| 2011/0087967 | A1 | 4/2011 | Ganz et al. |
| 2011/0313971 | A1 | 12/2011 | Hironaga |
| 2012/0054176 | A1 | 3/2012 | Chung et al. |
| 2012/0123858 | A1 | 5/2012 | Rosenthal |
| 2012/0130976 | A1 | 5/2012 | Cone et al. |
| 2013/0097156 | A1 | 4/2013 | Nagaralu et al. |
| 2013/0110824 | A1 | 5/2013 | DeRose et al. |
| 2013/0173368 | A1 | 7/2013 | Boutin et al. |
| 2013/0254294 | A1 | 9/2013 | Isaksson |
| 2013/0262436 | A1 | 10/2013 | Barsness et al. |
| 2013/0282686 | A1 | 10/2013 | Amin |
| 2014/0059029 | A1 | 2/2014 | Magill et al. |
| 2014/0129534 | A1 | 5/2014 | Riley et al. |
| 2014/0129535 | A1 | 5/2014 | Riley et al. |
| 2014/0129540 | A1 | 5/2014 | Riley et al. |
| 2015/0066894 | A1 | 3/2015 | Riley et al. |
| 2015/0379148 | A1 | 12/2015 | Riley et al. |
| 2018/0101581 | A1* | 4/2018 | Toumura ............... G06F 16/907 |
| 2018/0107697 | A1* | 4/2018 | Tariq ................ G06F 16/24539 |
| 2018/0246977 | A1 | 8/2018 | Riley et al. |
| 2018/0260487 | A1 | 9/2018 | Riley et al. |
| 2019/0303352 | A1 | 10/2019 | Levine et al. |
| 2019/0384798 | A1 | 12/2019 | Riley et al. |

OTHER PUBLICATIONS

"Google Search Appliance"; Obtained from Internet: <http://developers.google.com/search-appliance/documentation/50/help_gsa/serve_keymatch>; retrieval date: Oct. 10, 2012; 4 pages.

Sexton, Patric, "How to put Google custom site search into your current website design", posted May 8, 2007, internet retrieval Oct. 28, 2013, <http://moz.com/ugc/how-to-put-google-custom-site-search-into-your-current-website-design>, 21 pages.

Biundo, John et al. "Creating Advanced Custom Search Engines" Nov. 15, 2016; internet retrieval May 14, 2014 <http://blogoscoped.com/archive/2006-11-15-n50.html>, 9 pages.

"Custom Search Help," by Google. (Screenshots from Oct. 21-Nov. 30, 2011) Internet Archive source: <http://web.archive.org/web/2011130104016/http://support.google.com/customsearch/> Original URL: <http://support.google.com/customsearch/>, 6 pages.

"Office Action", British Patent Application No. GB2106138.7, dated Sep. 17, 2021, 7 pages.

"Extended European Search Report", European Patent Application No. 21171288.0, dated Oct. 15, 2021, 8 pages.

Eeckhaut, Hendrik, "How to Get Multiple Search Result Tabs," Sigasi.com, <URL:https://insights.sigasi.com/tech/how-get-multiple-search-result-tabs/>, May 29, 2010, 3 pages.

* cited by examiner

ASYNCHRONOUS SEARCH OF ELECTRONIC ASSETS VIA A DISTRIBUTED SEARCH ENGINE

CROSS-REFERENCE(S) TO RELATED APPLICATION(S)

This application claims the benefit and priority of U.S. Provisional Application Ser. No. 63/131,993, filed on Dec. 30, 2020, which is hereby incorporated by reference herein in its entirety, including all references and appendices cited therein, for all purposes, as if fully set forth herein.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

SUMMARY

Figure 1:
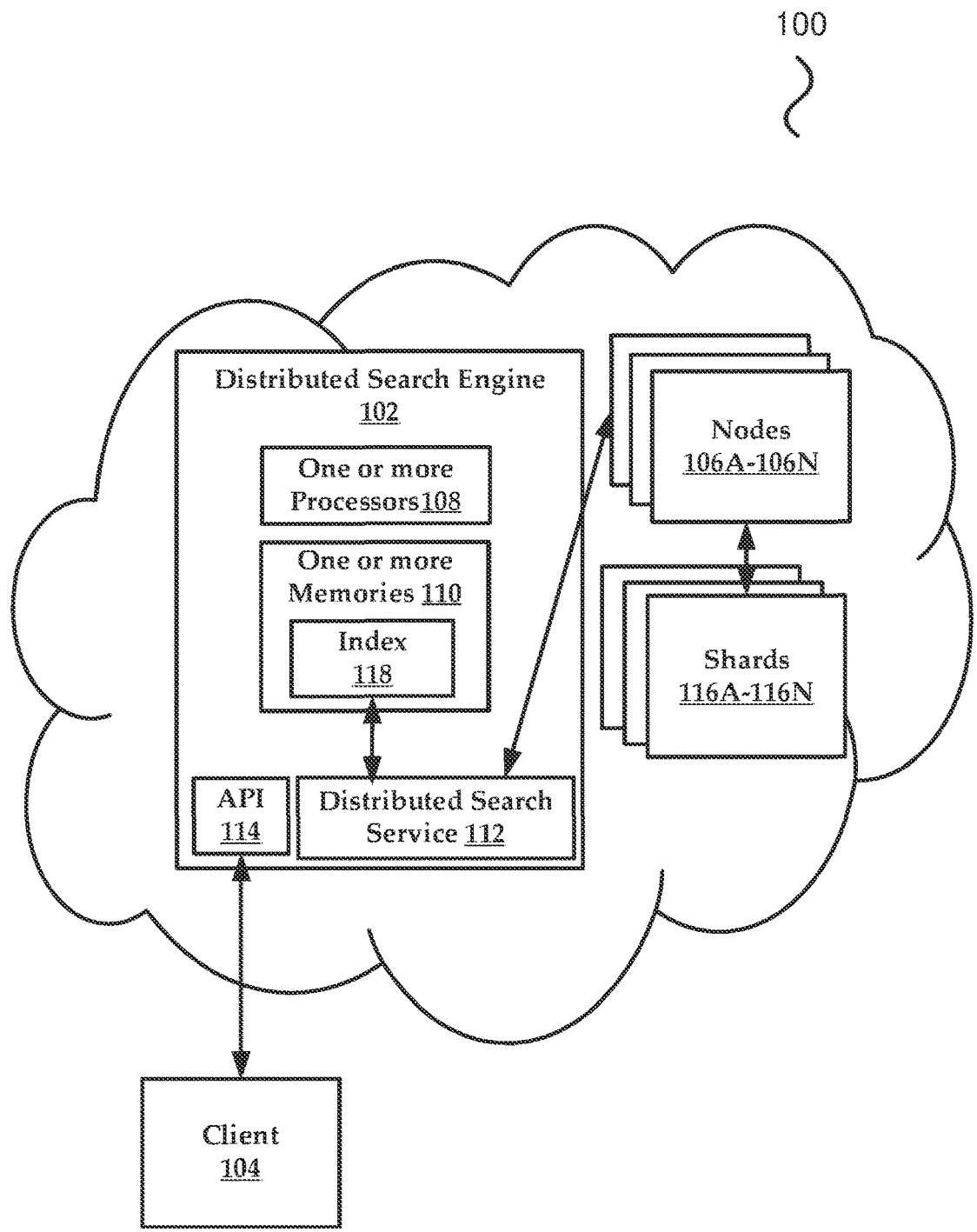
FIG. 1 is a schematic diagram of an example environment where aspects of the present disclosure can be practiced.

According to some embodiments, the present disclosure can be directed to a method comprising receiving a request from a user, the request comprising a query and a query time parameter, the query time parameter defining a time that the user will wait for results to be completed synchronously, executing the query, determining query results are incomplete and that the time has been exceeded, returning initial query results of the query results that have been completed within the time, issuing the query a unique query identifier, and asynchronously adding additional results to the portion of the query results based on the unique query identifier. In some instances, the query results (both synchronous and asynchronous can be aggregated and/or reduced into an index).

According to some embodiments, the present disclosure can be directed to a system comprising one or more processors; and one or more memories, the one or more memories storing instructions that can be executed by the one or more processors to receive a request from a user, the request comprising a query and a query time parameter, the query time parameter defining a time that the user will wait for results to be completed synchronously, execute the query, determine query results are incomplete and that the time has been exceeded, return initial query results of the query results that have been completed within the time as an index that is stored in the one or more memories, issue the query a unique query identifier; and asynchronously add additional results to the index based on the unique query identifier.

According to some embodiments, the present disclosure can be directed to a method comprising receiving a request from a user, the request comprising a query and a query time parameter, the query time parameter defining a time that the user will wait for results to be completed synchronously; determining query results are incomplete and that the time has been exceeded; issuing the query a unique query identifier; and asynchronously adding additional results to an index based on the unique query identifier.

DETAILED DESCRIPTION

Overview

The present disclosure pertains to systems and methods for conducting an efficient asynchronous search of electronic assets, such as electronic documents and/or indices. In exemplary embodiments, the asynchronous search allows a client device to submit a search query at one time and receive full or partial results at a later time, without having to keep the communication channel open to wait indefinitely for a large search query to complete. A user can request the search results later with a unique query identification number (QID), and view either incremental or full search results (when available).

With conventional search engines, a search query is run upon request by a user, and the user is unable to take any other actions until the search query has been completed. This is referred to generally as the user being blocked. When searching a large corpus of electronic assets, it can take a substantial amount of time for the search query to be completed, thus locking the user on the search screen unable to take any other actions while waiting for the search to be completed.

In embodiments disclosed herein, a user can view incremental search results, results can be returned to a credentialed user on any client device, and a user can choose to switch between synchronous and asynchronous searching models for various search queries.

In some instances, the systems and methods can be configured to receive a request from a user, where the request includes a query and a query time parameter. Generally, the query time parameter defines a time that the user will wait for results to be completed synchronously.

The systems and methods can execute the query and determine that query results are incomplete and that the time has been exceeded. The systems and methods can optionally return a portion of the query results that have been completed within the time. In some embodiments, the results are added to an index. The systems and methods can also issue the query a unique query identifier based on exceeding the time set forth in the query time parameter.

In various embodiments, the systems and methods can be configured to asynchronously add additional results to the index based on the unique query identifier. That is, as asynchronous results are obtained, they can be added to the synchronously generated results (and/or other asynchronous results) that have already been returned or indexed.

In some embodiments, the systems and methods can be configured to incrementally reduce query results (synchronous and/or asynchronous) to incrementally reduce the size of the index/results. In additional embodiments, incremental results are linked together using the QID established for the asynchronous portions of the query. Access to the QID can be limited to the user(s) who requested the query, in some instances using authentication credentials provided when the user logged into the search engine/service.

FIG. 1 illustrates an example architecture 100. The architecture 100 comprises a distributed search engine 102, a client 104, and various nodes 106A-106N. In general, the distributed search engine 102 can be implemented as a cloud that comprises one or more processors 108 (e.g., compute resources) and one or more memories 110 (e.g., storage resources). The distributed search engine 102 can implement an asynchronous search service 112 that implements the asynchronous search features described in greater detail herein. For context, when discussing processes/methods performed by the distributed search engine 102, this implicitly includes execution of instructions stored in memory by a processor.

Some or all of these components in the architecture 100 can communicate with one another using a network. The network can include combinations of networks that enable the components in the architecture 100 to communicate with one another. The network may include any one or a combination of multiple different types of networks, such as cellular, cable, the Internet, wireless networks, and other private and/or public networks. In some instances, the network may include Wi-Fi or Wi-Fi direct.

In some embodiments, the client 104 can access and use the distributed search engine 102 using an exposed application programming interface (API 114). The distributed search engine 102 provides near real-time search for any type of electronic data, including but not limited to, structured text, unstructured text, numerical data, geospatial data, metadata, and indices.

The distributed search engine 102 allows a user to quickly search across large amounts of data. There are situations where a search executes on many index shards, such as shards 116A-116N. The search can be executed against possibly frozen indices and spanning multiple remote clusters, for which results are not expected to be returned in milliseconds. When a user needs to execute long-running searches, synchronously waiting for its results to be returned is not ideal.

A user of the client 104 can submit a search request that gets executed by the search engine asynchronously. The client 104 can include any end-user computing device such as a personal computer, laptop, server, smart device, as well as any other virtual and/or physical computing device that would be known to one of ordinary skill in the art.

As part of the request, the user can specify a query time parameter. In general, the query time parameter defines a time that the user will wait for results to be completed synchronously. For example, the time of the query time parameter can include five seconds (other times can be used). If the query executed by the distributed search engine 102 is complete within the time (e.g., synchronously), the distributed search engine 102 need to conduct an asynchronous search. However, when executing the search, the distributed search engine 102 can determine that the search is not complete. For example, the distributed search engine 102 can determine that it has only received responses from seven of ten index shards within the allotted time. In order to obtain the remaining results, the distributed search engine 102 can await the results of the remainder of the query asynchronously. The distributed search engine 102 can assign a QID to the query. The user can monitor the progress of the request, and retrieve results at a later stage using the QID. Users can also retrieve partial results as they become available but before the search has completed using the QID.

When the user logs in to access the distributed search engine 102, the user can be authenticated using credentials, such as an email address and password provided through the API 114. When authenticated, these authentication credentials can be associated with the QID. This ensures that only the user(s) who were authenticated and specified the parameters of the query can use the QID.

It will be understood that in some instances a search can query a slower storage resource, or a large amount of data, for which synchronous search may take a long time; hence an asynchronous approach becomes advantageous. In certain situations, fast search is undesirable. Asynchronous search features allow a user flexibility to balance the speed of search execution, the amount of data that can be searched in a single go, and the cost of the hardware to support their use case. That is, asynchronous search allows a user to make a search go slowly to search over massive amounts of data Asynchronous searching also enables querying of data that is stored on less expensive storage, hence slower to be queried.

In these exemplary situations, the API 114 is adapted accordingly. In an exemplary embodiment, a communication channel cannot be relied upon to be held open for several minutes at the HTTP layer. Thus, the channel is closed and the results are retrieved in a separate channel at a later time, asynchronously.

Asynchronous search lets a user run potentially long-running queries in the background, allowing the user to track their progress and retrieve partial results as they become available. Users can run an asynchronous search query in the background and continue to do other things in the software platform.

Sometimes users need to be able to search through vast amounts of data (potentially many petabytes of data) no matter how long the search takes. To be sure, there are times when long-running queries are desired. Consider regulatory audits or threat hunting scenarios that need to search through years and years of data—data that has, in fact, likely been moved to more economical (cold) storage. These examples can benefit from asynchronous search.

Asynchronous search makes long-running queries feasible and reliable. Asynchronous search allows users to run long-running queries in the background, track the query progress, and retrieve partial results as they become available. Asynchronous search enables users to more easily search vast amounts of data with no more pesky timeouts.

In exemplary embodiments, an asynchronous search query can be first split into multiple smaller searches per index. Then for each index, sub-searches can be conducted per-shard. In this way, millions (could be more or fewer) of documents can be handled and searched. In this example, a shard is a division of the data (e.g., atomic unit), and each of the shards contains a subset of the entire document set.

Because the search engine can split a search query into these multiple sub searches, once a sub search is finished, the response is provided to the user through the API 114, and the user can get a partial view of the response before it completes. In one embodiment, the user can initially receive results obtained during the synchronous part of the query. The results can be placed in an index 118 stored in the one or more memories of the distributed search engine 102 (can be stored in long-term storage as well).

That is, the user can receive results collected when the client 104 was connected to the distributed search engine 102, and prior to expiration of the time specified in the query time parameter. Using the example above, search results obtained at a time of up to five seconds may be provided to the client 104. Those results obtained after five seconds may be aggregated with these initial results in an index that can be stored in memory or long-term, non-volatile storage by the distributed search engine 102. As noted above, the distributed search engine 102 can tie incrementally received search results together using the QID assigned.

Thus, search responses can be provided incrementally to the user. That is, the results from each shard/sub-search are combined with one another as soon as they are available, instead of being combined once at the end when all sub-searches have finished. In this way, incremental search results can be provided to the user. For example, this incrementalism allows the system provides more feedback to end users about the query they are running. From a user interface perspective, users would be able to see some of the results before the query is completed, or a progress bar indicating how long the query took and how long it is expected to take to complete. This also allows the asynchronous search to reduce the memory needed to keep the partial results available.

In some embodiments, a second API can be used by the client for retrieving asynchronous search results which allow a user to monitor the progress of an asynchronous search request and retrieve its results. An ongoing asynchronous search can be deleted through yet another API for deleting an asynchronous search request.

When submitting a search query, the response can comprise the QID of the search being executed. A user can then use this QID to later retrieve the search's final results. Available (partial) search results may be returned as part of the response object.

When the query is no longer running, an indication is provided to the client 104 as to whether the search failed or was completed on all index shards. While the query is being executed by the distributed search engine 102, is_partial parameter may be set to "true" in the API 114. Further, the API 114 provides information such as how many shards the search will be executed on overall, and how many shards have completed. An additional parameter is provided regarding how many documents are currently matching the search query, belonging to the shards that have already completed the search.

Although a query may be no longer running, search results may be partial. This may occur when the search failed after some shards returned their results, or when the node that is coordinating the asynchronous search terminates.

The user can specify that the distributed search engine 102 can block and wait to return results until the search is completed up to a certain timeout by providing a wait_for_completion_timeout parameter, which defaults to one second. When the asynchronous search completes within such timeout, the response may not include the QID as the results are not stored in the cluster. The keep_on_completion parameter, which defaults to false, can be set to true to request that results are stored for later retrieval also when the search completes within the wait_for_completion_timeout.

A user can also specify how long the asynchronous search and/or results may be made available through the keep_alive parameter, which defaults to five days in some embodiments. Ongoing asynchronous searches and any saved search results can be deleted after this period.

In exemplary embodiments, when the primary sort of the results is an indexed field, shards get sorted based on minimum and maximum value that they hold for that field, hence partial results become available following the sort criteria that was requested. Further, this allows users to obtain quick feedback on more recent data through the partial results, assuming they are sorting by date. This allows the server to prioritize querying the most interesting portion of the data in order to provide feedback to the end user.

The API 114 may have similar parameters to a synchronous search submission API provided by the distributed search engine 102. However, certain default parameter values may differ, such as batched_reduce_size defaults to five and affect how often partial results become available, which happens whenever shard results are reduced, as will be discussed in greater detail infra. The distributed search engine 102 can perform a partial, incremental reduction when a coordinating node has received a certain number of new shard responses (five by default). A request_cache variable defaults to true, and a pre_filter_shard_size defaults to one to enforce the execution of a pre-filter roundtrip to retrieve statistics from each shard so that the ones that surely don't hold any document matching the query get skipped. A variable ccs_minimize_roundtrips defaults to false.

The get async search API retrieves the results of a previously submitted asynchronous search request given its QID. If the security features are enabled, access to the results of a specific synchronous search may be restricted to the user that submitted it in the first place. In exemplary embodiments, the get async search API depicts whether the search is still being executed or has been completed. When the query is no longer running, indicates whether the search failed or was successfully completed on all shards. While the query is being executed, an is_partial variable can be set to true.

The distributed search engine 102 further indicates through the API 114 when the synchronous search will expire, and how many incremental reductions of the results have been performed. If this number increases compared to the last retrieved results, a user can expect additional results included in the search response. The distributed search engine 102 through the API 114 further indicates how many shards have executed the query. Note that in order for shard results to be included in the search response, they can be incrementally reduced first. In addition, partial aggregations results are provided, coming from the shards that have already completed the execution of the query. Incremental reduction may be performed iteratively to condense results from multiple shards into a single shard.

The wait_for_completion_timeout parameter can also be provided when calling the get async search API, in order to wait for the search to be completed up until the provided timeout. Final results will be returned if available before the timeout expires, otherwise, the currently available results will be returned once the timeout expires. By default, no timeout is set, meaning that the currently available results may be returned without any additional wait time.

The keep_alive parameter specifies how long the asynchronous search should be available in the cluster. When not specified, the keep_alive set with the corresponding submit, synchronous request will be used. Otherwise, it is possible to override such value and extend the validity of the request. When this period expires, the search, if still running, is canceled. If the search is completed, its saved results may be deleted from memory or non-volatile storage. A user can use a delete async search API to manually delete an asynchronous search by QID. If the search is still running, the search request will be canceled. Otherwise, the saved search results can be deleted by user request.

According to some embodiments, the distributed search engine 102 can be configured to obtain and evaluate historical data regarding query responsiveness regarding the shards 116A-116N (e.g., query execution parameters of the plurality of nodes). For example, the distributed search engine 102 can evaluate how long it takes an individual node to execute a query of a given size. The distributed search engine 102 can also track how many searches are currently queued for each shard. The distributed search engine 102 can utilize these data to determine how long a query/search may take. The distributed search engine 102 could provide the user with feedback regarding their particular query and query time parameter. By example, the user can specify a time of five seconds for their query (after which results are provided asynchronously). If the distributed search engine 102 determines that the query is likely to take fifteen seconds based on analysis of the shards, the distributed search engine 102 can inform the user that waiting an additional period longer than five seconds would result in the user receiving all the results of the query synchronously. In another example use case, users could receive an estimation of how costly a search is before executing the search.

Also, the distributed search engine 102 can allow users to be given permissions per node and/or shard. For example, a user may be allowed to view, edit, delete, move, or conduct other action(s) relative to a search result, index, or shard. These permissions can be tailored for each user.

Figure 2:
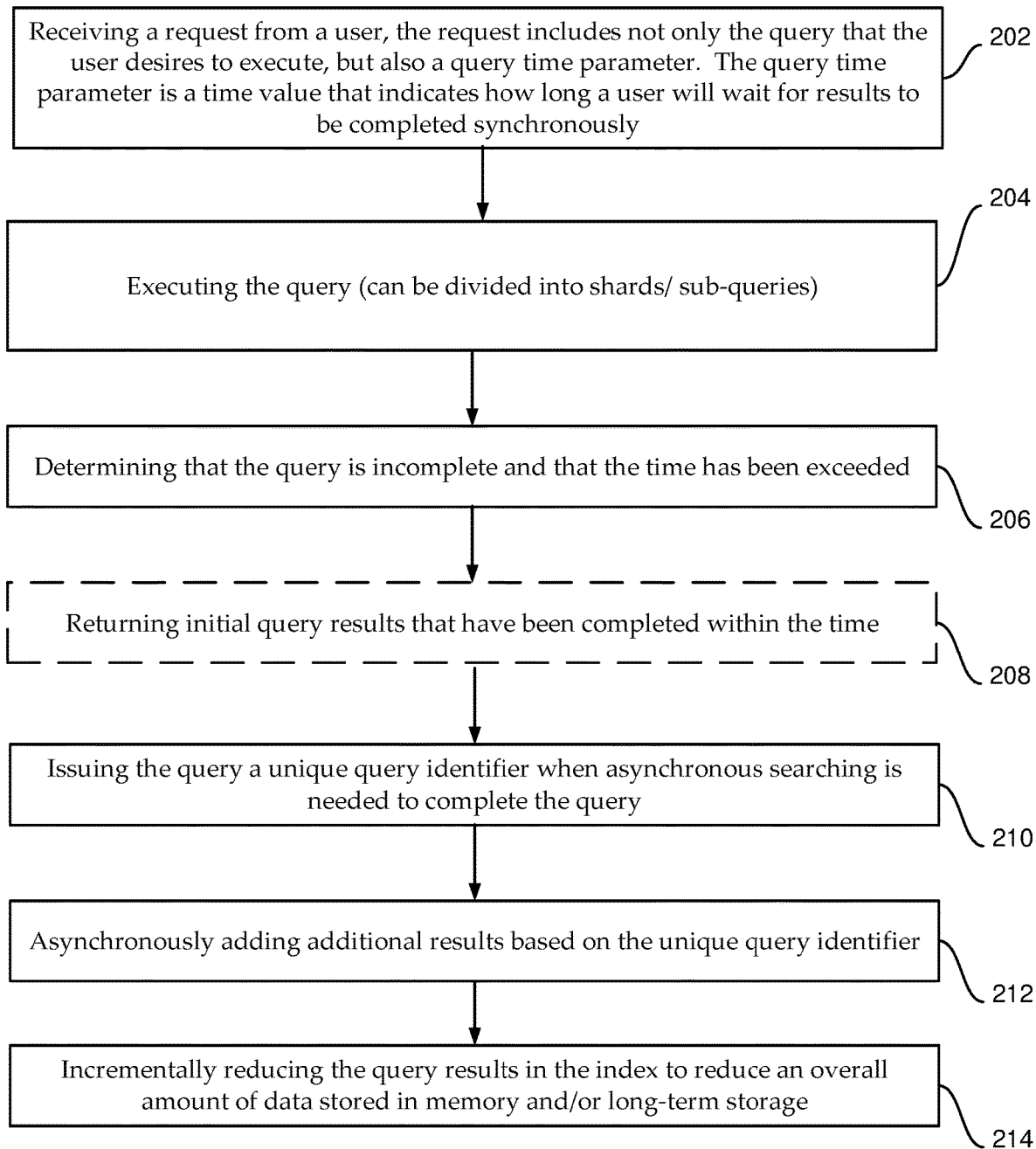
FIG. 2 is a flowchart of an example method of the present disclosure.

FIG. 2 is a flow chart of an example method of the present disclosure. The method can include a step 202 of receiving a request from a user. As noted above, the request includes not only the query that the user desires to execute but also a query time parameter. The query time parameter is a time value that indicates how long a user will wait for results to be completed synchronously.

The method can include a step 204 of executing the query. This can include separating the query into shards/sub-parts as noted above. The method can also include a step 206 of determining that the query is incomplete and that the time has been exceeded. As noted above, the query can be executed against a plurality of shards on a plurality of nodes in a simultaneous manner. When the time value has been exceeded, the method can include a step 208 of returning initial query results that have been completed within the time. Step 208 is optional in some instances. The user may opt to receive their results once the entirety of the query is completed, combining both the synchronous and asynchronous portions of the query.

In some embodiments, the method can include a step 210 of issuing the query a unique query identifier when asynchronous searching is needed to complete the query. The method can also include a step 212 of asynchronously adding additional results based on the unique query identifier. In one example, the initial query results returned during a synchronous portion of the query can be combined with additional results obtained during an asynchronous portion of the query. To be sure, there may be many iterations performed during the asynchronous portion of the query, leading to adding additional results being added in multiple iterations. As noted above, the query results can be added to an index.

The method can include a step 214 of incrementally reducing the query results in the index to reduce an overall amount of data stored in memory and/or long-term storage. In some embodiments, the method includes receiving authentication credentials for the user and associating authentication credentials for the user with the unique query identifier (QID).

The method can also include receiving a request from a user to review the index and determining that the user is authenticated to access the index based on the authentication credentials.

In one or more embodiments, the method can include identifying, based on data pertaining to prior queries, and/or query execution parameters (e.g., how busy or queued a node is) of the plurality of nodes, as well as determining an estimation as to whether the query can be completed within the time specified in the query time parameter based on the query execution parameters. The method may also include providing the estimate to the user on how costly the query is, or how long it is expected to take.

Figure 3:
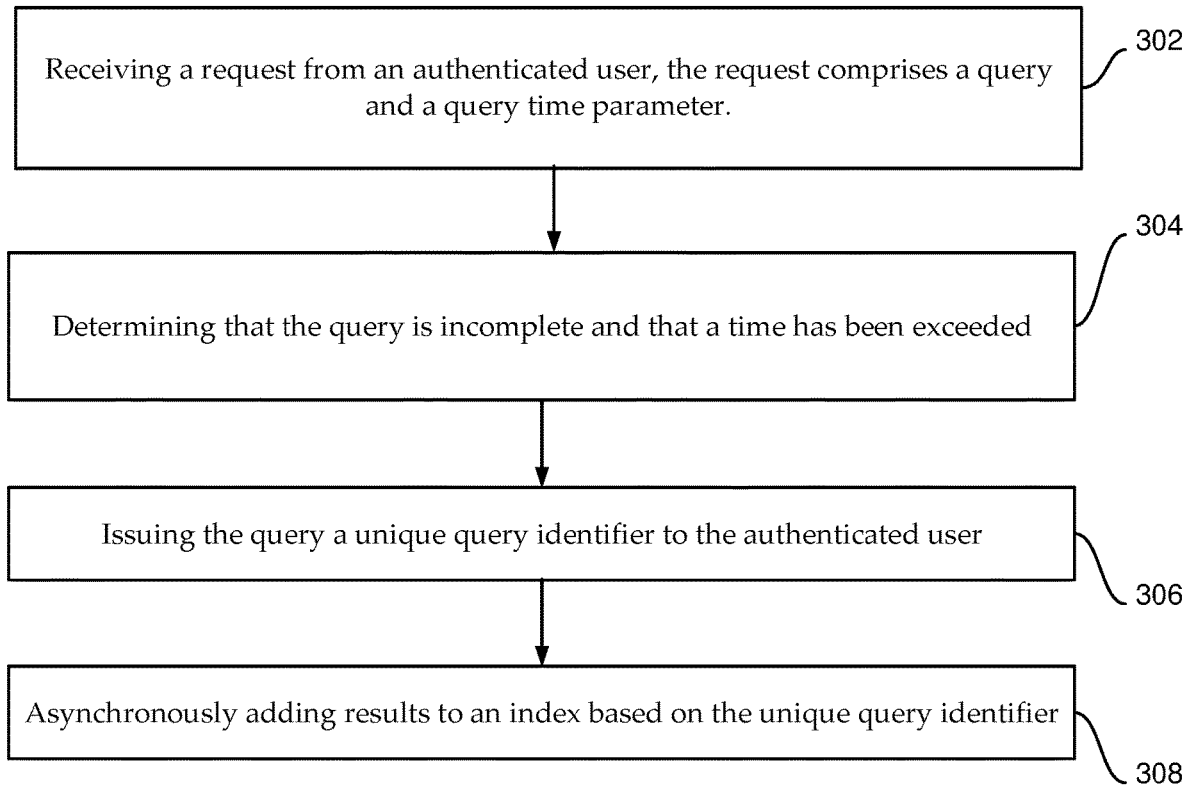
FIG. 3 is a flowchart of another example method of the present disclosure.

FIG. 3 is a flowchart of another example method of the present disclosure. The method includes a step 302 of receiving a request from an authenticated user. As noted above, the request comprises a query and a query time parameter. The method can also include a step 304 of determining that the query is incomplete and that a time has been exceeded. Next, the method includes a step 306 of issuing the query a unique query identifier to the authenticated user, along with a step 308 of asynchronously adding results to an index based on the unique query identifier.

Figure 4:
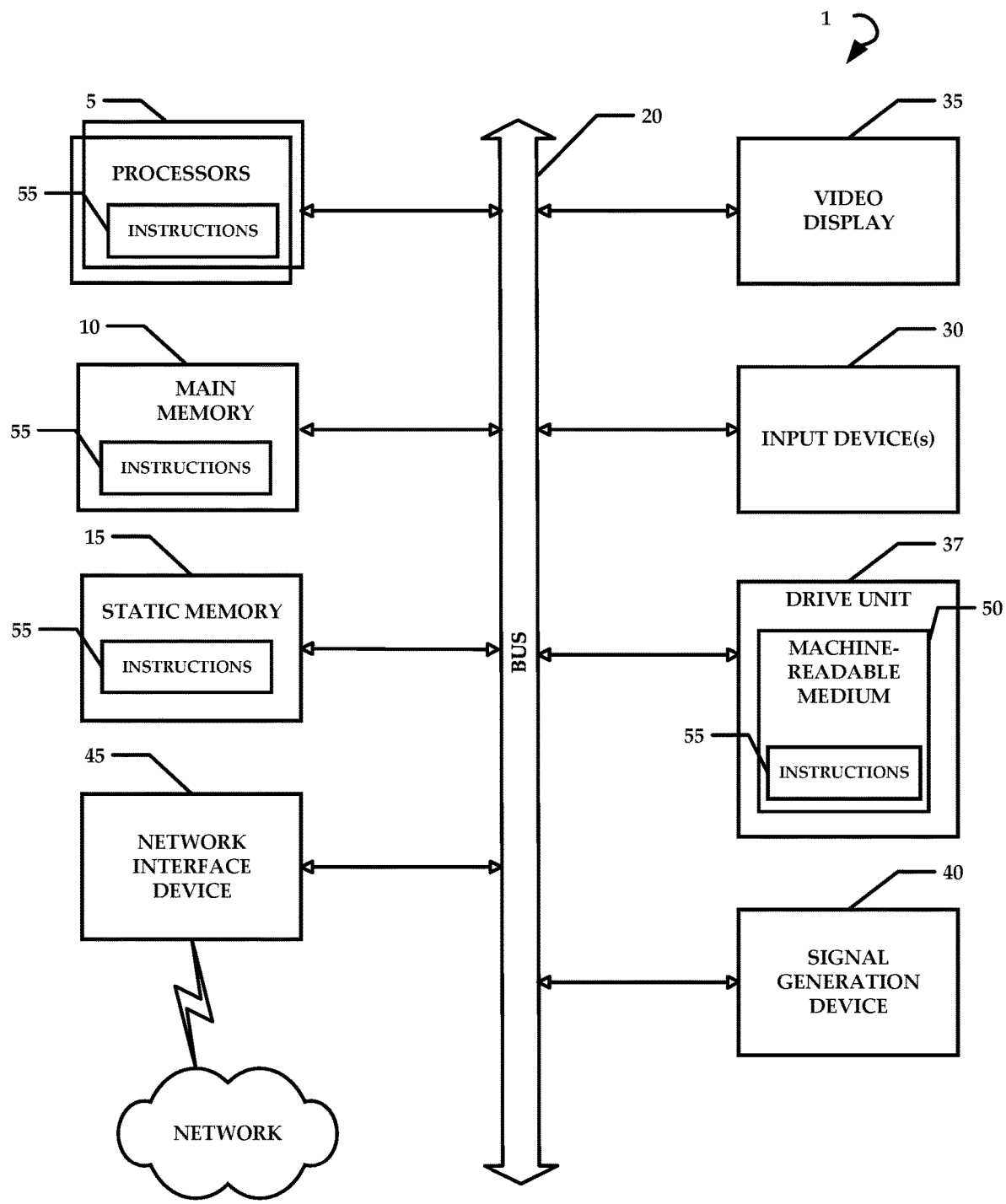
FIG. 4 is a schematic diagram of an example computer system that can be used to implement aspects of the present disclosure.

FIG. 4 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions.

The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive.

What is claimed is:

1. A method comprising:
   receiving a request from a user, the request comprising a query and a query time parameter, the query time parameter being set by the user and defining a time that the user will wait for results to be completed synchronously;
   executing the query, the query comprising executing a pre-filter roundtrip to retrieve statistics of at least one document file from at least one shard;
   determining that the query is incomplete and that the time has been exceeded;
   returning initial query results that were completed within the time;
   issuing the query a unique query identifier; and
   asynchronously adding additional results to the initial query results based on the unique query identifier.

2. The method according to claim 1, further comprising incrementally reducing the initial query results and the additional results to reduce a size of an index that comprises the initial query results and the additional results.

3. The method according to claim 2, further comprising:
   receiving authentication credentials for the user; and
   associating the authentication credentials for the user with the unique query identifier.

4. The method according to claim 3, further comprising:
   receiving a request from a user to review the index; and
   determining that the user is authenticated to access the index based on the authentication credentials.

5. The method according to claim 1, wherein the query is executed against a plurality of shards on a plurality of nodes in a simultaneous manner.

6. The method according to claim 5, further comprising:
   identifying, based on data pertaining to prior queries, query execution parameters of the plurality of nodes; and
   determining an estimation that indicates a cost of the query to the user.

7. The method according to claim 6, further comprising allowing the user to choose to wait for the results to be completed synchronously according to the estimate.

8. A distributed search engine, comprising:
   one or more processors; and
   one or more memories, the one or more memories storing instructions that can be executed by the one or more processors to:
      receive a request from a user, the request comprising a query and a query time parameter, the query time parameter being set by the user and defining a time that the user will wait for results to be completed synchronously;
      execute the query, the query comprising executing a pre-filter roundtrip to retrieve statistics of at least one document file from at least one shard;
      determine that the query is incomplete and that the time has been exceeded;
      return initial query results that were completed within the time as an index that is stored in the one or more memories;
      issue the query a unique query identifier; and
      asynchronously add additional results to the index based on the unique query identifier.

9. The distributed search engine according to claim 8, wherein the one or more processors are configured to incrementally reduce the initial query results and the additional results to reduce a size of the index.

10. The distributed search engine according to claim 8, wherein the one or more processors are configured to:
    receive authentication credentials for the user; and
    associate authentication credentials for the user with the unique query identifier.

11. The distributed search engine according to claim 10, wherein the one or more processors are configured to:
    receive a request from a user to review the index; and
    determine that the user is authenticated to access the index based on the authentication credentials.

12. The distributed search engine according to claim 8, wherein the one or more processors are configured to execute the query against a plurality of shards on a plurality of nodes in a simultaneous manner.

13. The distributed search engine according to claim 12, wherein the one or more processors are configured to:
    identify, based on data pertaining to prior queries, query execution parameters of the plurality of nodes;
    determine an estimation as to whether the query can be completed within the time specified in the query time parameter based on the query execution parameters; and
    provide the estimate to the user when the estimation is greater than the time specified in the query time parameter.

14. The distributed search engine according to claim 13, wherein the one or more processors are configured to allow the user to choose to wait for the results to be completed synchronously according to the estimate.

15. A method comprising:

receiving a request from a user, the request comprising a query and a query time parameter, the query time parameter being set by the user and defining a time that the user will wait for results to be completed synchronously;

execute the query, the query comprising executing a pre-filter roundtrip to retrieve statistics of at least one document file from at least one shard;

determining that the query is incomplete and that the time has been exceeded;

issuing the query a unique query identifier; and asynchronously adding results to an index based on the unique query identifier.

16. The method according to claim 15, further comprising obtaining initial query results and placing the initial query results in the index.

17. The method according to claim 16, further comprising incrementally reducing the initial query results and the additional results to reduce a size of the index.

18. The method according to claim 15, further comprising:

receiving authentication credentials for the user;
associating the authentication credentials for the user with the unique query identifier;
receiving a request from a user to review the index; and
determining that the user is authenticated to access the index based on the authentication credentials.

19. The method according to claim 15, further comprising:

identifying, based on data pertaining to prior queries, query execution parameters of a plurality of nodes used to process the query;
determining an estimation as to whether the query can be completed within the time specified in the query time parameter based on the query execution parameters; and
providing the estimate to the user when the estimation is greater than the time specified in the query time parameter.

20. The method according to claim 19, further comprising allowing the user to choose to wait for the results to be completed synchronously according to the estimate.

\* \* \* \* \*